United States Patent Office 2,750,351
Patented June 12, 1956

2,750,351

PLASTICIZED VINYL POLYMER COMPOSITIONS

Massimo Baer, Springfield, Mass., assignor to Monsanto Chemical Company, St. Louis, Mo., a corporation of Delaware No Drawing. Application November 9, 1954, Serial No. 467,879

11 Claims. (Cl. 260—30.6)

This invention relates to plasticized vinyl polymer compositions. More particularly, this invention relates to flame resistant plasticized vinyl and vinylidene chloride polymer compositions having good low temperature flexibility properties coupled with good plasticizer retention properties.

A wide variety of materials have been proposed as plasticizers for vinyl and vinylidene chloride polymers and while the results have been generally satisfactory, there has been much to be desired. Conventional plasticizers normally tend to migrate from vinyl and vinylidene chloride polymers with the passage of time, thus causing eventual embrittlement of the polymers. In addition, conventional plasticizers frequently tend to be ineffective at temperatures much below room temperature. Difficulty has also been encountered with respect to the flammability of plasticized compositions of this nature since many of the plasticizers are of an inflammable nature.

Accordingly, an object of the present invention is the provision of plasticized vinyl and vinylidene chloride polymer compositions having improved physical properties.

Another object is the provision of flame-resistant plasticized vinyl and vinylidene chloride polymer compositions, such compositions having good low temperature flexibility properties coupled with good plasticizer retention properties.

These and other objects are attained by incorporating into a thermoplastic polymer of vinyl or vinylidene chloride a plasticizing amount of the reaction product of (1) a trialkyl phosphite of which the alkyl radicals contain 1–12 carbon atoms and (2) a homopolymer of allyl chloride or a copolymer of about 20–99 percent allyl chloride with, correspondingly, about 80–1 percent of an ethylenically unsaturated monomer copolymerizable therewith, such homopolymer or copolymer having an average degree of polymerization of about 4–20 and such reaction product containing about 0.2–1 mol of combined phosphorous per mol of combined allyl chloride in the polymer.

The following examples are given in illustration and are not intended as limitations on the scope of this invention. Where parts are mentioned, they are parts by weight.

*Example I*

Place a mixture of about 100 parts of an allyl chloride pentamer (i. e. an allyl chloride homopolymer having an average degree of polymerization of about 5) with about 160 parts of tributyl phosphite in a suitable reaction vessel fitted with a water-cooled condenser having a collection trap. Flush the flask with nitrogen in order to establish an inert atmosphere and then heat the mixture with agitation to a temperature of about 210–220° C., whereby a reaction between the pentamer and the tributyl phosphite is initiated. Butyl chloride is evolved as a result of the reaction and is collected in the condenser trap. The reaction mixture should be maintained at the indicated temperature until the evolution of butyl chloride ceases (i. e. until the reaction is substantially complete). On cooling, a pale yellow liquid reaction product is obtained in the reaction vessel, which product contains approximately 0.4 mol of combined phosphorous per mol of combined allyl chloride in the pentamer.

Incorporate about 50 parts of the thus-prepared plasticizer into about 100 parts of polyvinyl chloride on a set of mill rolls heated at a temperature of about 100° C. Films formed from the resultant composition are clear and show no signs of heterogeneity. The films are not discolored when heated for 10 hours at a temperature of about 100° C. and, in addition, there is no noticeable loss of plasticizer. The plasticized polyvinyl chloride composition has a flex temperature of about −15° C. when tested for flexibility in accordance with A. S. T. M. Test No. D 1043–51 (Clash-Berg low temperature flexibility test). There is no substantial loss of plasticizer on ageing and the composition will retain its low temperature flexibility properties after being stored for 6 months at a temperature of about 90° F. The material will burn in an open flame but is self-extinguishing when the flame is removed.

Incorporate about 10 parts of the polyallyl chloride-tributyl phosphite reaction product into about 100 parts of a copolymer of about 85 percent vinylidene chloride with about 15 percent vinyl chloride. This composition is likewise flame-resistant, and has good low temperature flexibility properties coupled with good plasticizer retention properties.

*Example II*

Place a mixture of about 250 parts of triethyl phosphite with about 100 parts of a decamer of allyl chloride (i. e., a homopolymer of allyl chloride having an average degree of polymerization of about 10) in a suitable reaction vessel. Flush the flask with nitrogen in order to establish an inert atmosphere and then heat the reaction mixture with agitation to a temperature of about 200–220° C. to initiate an ethyl chloride-liberating reaction. The ethyl chloride is vented to the atmosphere. The reaction mixture should be maintained at the indicated temperature until the evolution of ethyl chloride ceases, at which time the reaction is substantially complete. On cooling, a pale yellow liquid reaction product is obtained which contains about 0.9 mol of phosphorus per mol of combined allyl chloride in the decamer.

Incorporate about 50 parts of the thus-prepared plasticizer into about 100 parts of polyvinyl chloride on a set of mill rolls heated at a temperature of about 100° C. Films formed from the resultant composition are clear and homogeneous. The films are not discolored when heated for 10 hours at a temperature of about 100° C. and, in addition, there is no noticeable loss of plasticizer. The plasticized polyvinyl chloride composition has a flex temperature of less than 0° C. There is no substantial loss of plasticizer on ageing and the composition will retain its low temperature flexibility properties after being stored for 6 months at a temperature of about 90° F. The material will burn in an open flame but is self-extinguishing when the flame is removed.

*Example III*

Place about 100 parts of a copolymer of about 65 percent allyl chloride with about 35 percent vinyl acetate, such copolymer having an average degree of polymerization of about 10, in a suitable reaction vessel fitted with a water-cooled condenser provided with a collection trap and add about 100 parts of tributyl phosphite thereto. Flush the vessel with nitrogen in order to establish an inert atmosphere and then heat the mixture with agitation to a temperature of about 200–220° C. to initiate a butyl chloride-liberating reaction. Collect the butyl chloride in the trap. The reaction mixture should be maintained at the indicated temperature until the evolution of butyl chloride ceases, at which time the reaction is substantially complete. On cooling, a pale yellow liquid reaction product is obtained which contains approximately 0.8 mol of combined phosphorus per mol of combined allyl chloride in the copolymer.

Incorporate about 50 parts of the thus-prepared plasticizer into about 100 parts of polyvinyl chloride on a set of mill rolls heated at a temperature of about 100° C. Films formed from the resultant composition are clear and homogeneous. The films are not discolored when heated for 10 hours at a temperature of about 100° C. and, in addition, there is no noticeable loss of plasticizer. The plasticized polyvinyl chloride composition has a flex temperature of less than about $-10°$ C. There is no substantial loss of plasticizer on ageing and the composition will retain its low temperature flexibility properties after being stored for 6 months at a temperature of about 90° F. The material will burn in an open flame but is self-extinguishing when the flame is removed.

A flame resistant composition having good plasticizer retention properties and a low temperature flexibility of less than about 0° C. is also obtained when about 50 parts of the reaction product of the tributyl phosphite with the allyl chloridevinyl acetate copolymer are incorporated into about 100 parts of a copolymer of about 85 percent of vinyl chloride with about 15 percent of vinyl acetate on a set of mill rolls heated at a temperature of about 100° C.

The plasticizers of the present invention are derived from homopolymers of allyl chloride and copolymers of about 20–99 percent of allyl chloride with, correspondingly, about 80–1 percent of an ethylenically unsaturated monomer copolymerizable therewith. Such homopolymers and copolymers should have an average degree of polymerization of about 4–20 (i. e. should contain an average of about 4–20 combined monomer units in each polymer chain). Representative ethylenically unsaturated monomers that can be copolymerized with allyl chloride either alone or in admixture with one another include vinyl chloride, vinylidene chloride, vinyl esters such as vinyl acetate, vinyl propionate, vinyl butyrate, vinyl 2-ethyl hexanoate, etc., vinyl benzoate, allyl alcohol, vinyl ethers such as vinyl chlorethyl ether, etc.

Allyl chloride homopolymers and copolymers having the desired degree of polymerization can be prepared by polymerizing allyl chloride or a mixture of allyl chloride with one or more ethylenically unsaturated monomers copolymerizable therewith in the presence of about 0.5–5 percent of a suitable polymerization catalyst such as benzoyl peroxide, di-tertiary butyl peroxide, tertiary butyl perbenzoate, potassium persulfate, lauroyl peroxide, azo, azo-bis-di-isobutyronitrile, etc. A mass polymerization process is preferably used, although other suitable conventional polymerization processes such as a solvent polymerization process, etc. may also be used if desired. The average degree of polymerization can be controlled within comparatively accurate limits by regulating reaction temperature, catalyst concentration, etc. It is generally preferable to avoid the use of a reaction temperature in excess of about 120° C. Generally speaking, the degree of polymerization is minimized by using a relatively high reaction temperature and a relatively large catalyst concentration. As the catalyst concentration, reaction temperature or both are decreased, the molecular weight is increased. Thus, for example, the allyl chloride pentamer of Example I may be prepared by heating a solution of about 2 parts of benzoyl peroxide in about 100 parts of allyl chloride with agitation at a temperature of about 80° C. for about 5 hours, while the allyl chloride decamer of Example II may be prepared by heating a solution of about 1 part of benzoyl peroxide in about 100 parts of allyl chloride with agitation at a temperature of about 45–50° C. for about 10 hours. In a similar fashion the allyl chloride-vinyl acetate copolymer of Example III may be prepared by heating a solution of about 2.5 parts of benzoyl peroxide in a mixture of about 100 parts of allyl chloride and about 55 parts of vinyl acetate with agitation at a temperature of about 80° C. for about 25 hours.

The homopolymers and copolymers of allyl chloride are unstable at high temperatures and, as a result, are rapidly discolored at normal processing temperatures. Also, the homopolymers of allyl chloride and many of the copolymers thereof are essentially incompatible with polymers of vinyl and vinylidene chloride. Thus, both the allyl chloride pentamer of Example I and the allyl chloride decamer of Example II are incompatible with polyvinyl chloride. Although some of the allyl chloride copolymers are compatible with vinyl and vinylidene chloride polymers, the resultant compositions usually have an unsatisfactorily high flex temperature. For example, the allyl chloride-vinyl acetate copolymer of Example III is compatible with polyvinyl chloride but a composition comprising about 50 parts of the copolymer and about 100 parts of polyvinyl chloride will have a flex temperature of about $+15°$ C. Accordingly, the homopolymers and copolymers of allyl chloride, in and of themselves, are not satisfactory plasticizers for vinyl and vinylidene chloride polymers.

The plasticizers of the present invention are prepared by reacting an allyl chloride homopolymer or copolymer of the above description with an amount of a trialkyl phosphite sufficient to provide about 0.2 to 1 mol of combined phosphorous per mol of combined allyl chloride in the polymer or copolymer. The alkyl radicals of the trialkyl phosphite should contain from 1–12 carbon atoms. If desired, a mixture of two or more allyl chloride polymers, a mixture of two or more trialkyl phosphites, or mixtures of both may be inter-reacted to form the plasticizers of the present invention. Representative of the trialkyl phosphites that may be reacted with the allyl chloride polymers are trimethyl phosphite, triethyl phosphite, tripropyl phosphite, tributyl phosphite, tri-2-ethylhexyl phosphite, trioctyl phosphite, tridodecyl phosphite, diethyl butyl phosphite, methyl diethyl phosphite, etc.

The trialkyl phosphite and the allyl chloride polymer should be reacted in an oxygen-free atmosphere at a temperature of about 150–250° C. Alkyl chlorides are formed during the course of the reaction. They may be vented to the atmosphere as in Example II or collected in a trap as in Examples I and III.

The vinyl and vinylidene chloride polymers to be plasticized in accordance with the present invention include the homopolymers of vinyl and vinylidene chloride and the copolymers of such monomers with each other and with other ethylenically unsaturated monomers copolymerizable therewith. If desired, a mixture of two or more ethylenically unsaturated monomers may be copolymerized with the vinyl or vinylidene chloride. Among the ethylenically unsaturated monomers that can be copolymerized with vinyl chloride, vinylidene chloride, or both are compounds such as acrylonitrile, vinyl acetate, methyl acrylate, methyl methacrylate, diethyl maleate, etc. Generally speaking, the copolymers should preferably contain about 50 percent or more of vinyl chloride, vinylidene chloride or a mixture of vinyl chloride with vinylidene chloride. If desired, a mixture of two or more compatible homopolymers or copolymers of vinyl chloride or vinylidene chloride may be plasticized with the plasticizers of the present invention.

The amount of plasticizer to be used is largely determined by the extent to which the vinyl and vinylidene chloride polymers are to be plasticized. Generally speaking, about 5–150 parts of plasticizer may be used for each 100 parts of vinyl or vinylidene chloride polymer. When the polymer contains about 80 percent or more of vinyl chloride it is usually preferable to use about 30–70 parts of plasticizer per 100 parts of polymer. Compositions containing this amount of plasticizer are useful in the preparation of sheets, films, electrical insulation, flexible tubing, etc. In preparing soft, highly filled plasticized compositions based on polymers of 80% or more of vinyl chloride it is sometimes desirable to use as much as about 100–150 parts of plasticizer per 100 parts of polymer. On the other hand, in preparing so-called "semi-rigid" polyvinyl chloride compositions for use in the preparation of rigid pipe, structural members, etc., it is generally desirable to use from about 5–25 parts of plasticizer per 100 parts of polyvinyl chloride. Polymers containing about 80 percent or more of vinylidene chloride are preferably plasticized with about 5–25 parts of plasticizer per 100 parts of polymer.

For many purposes it is desirable to blend other conventional additives with the plasticized vinyl and vinylidene chloride polymer compositions of the present invention, illustrative of which are fillers, dyes, pigments, stabilizers, lubricants, etc.

The plasticized vinyl and vinylidene chloride polymer compositions which are prepared in accordance with the present invention are characterized by excellent low temperature flexibility properties, good plasticizer retention properties and flame resistance. A particularly valuable property is the permanence of plasticization, for the plasticizers of the present invention are essentially non-migratory. As a result, the compositions tend to remain free from embrittlement with the passage of time.

What is claimed is:

1. A composition of matter comprising a polymer taken from the group consisting of thermoplastic polymers of vinyl chloride and vinylidene chloride which contain at least 50 weight percent of said chloride containing monomers, said thermoplastic polymer having homogeneously incorporated therein a plasticizing amount of the heat reaction product of (A) a trialkyl phosphite having alkyl radicals containing 1–12 carbon atoms with (B) an allyl chloride polymer taken from the group consisting of homopolymers of allyl chloride and copolymers of about 20–99 percent allyl chloride with, correspondingly, about 80–1 percent of an ethylenically unsaturated monomer copolymerizable therewith, said allyl chloride polymer having an average degree of polymerization of about 4–20 and said heat reaction product containing about 0.2–1 mol of combined phosphorous per mol of combined allyl chloride in the allyl chloride polymer.

2. A composition of matter as in claim 1 wherein the thermoplastic polymer is a polymer of vinyl chloride.

3. A composition of matter as in claim 1 wherein the thermoplastic polymer is polyvinyl chloride and the heat reaction product is the reaction product of a homopolymer of allyl chloride with tributyl phosphite.

4. A composition of matter as in claim 1 wherein the thermoplastic polymer is polyvinyl chloride and the heat reaction product is the reaction product of a homopolymer of allyl chloride with triethyl phosphite.

5. A composition of matter as in claim 1 wherein the thermoplastic polymer is polyvinyl chloride and the heat reaction product is the reaction product of tributyl phosphite with a copolymer of allyl chloride and vinyl acetate.

6. A composition of matter as in claim 1 wherein the thermoplastic polymer is a copolymer of vinyl chloride with vinyl acetate and wherein the heat reaction product is the reaction product of tributyl phosphite with a copolymer of allyl chloride and vinyl acetate.

7. A composition of matter as in claim 1 wherein the thermoplastic polymer is a polymer of vinylidene chloride.

8. A composition of matter as in claim 1 wherein the thermoplastic polymer is a copolymer of vinylidene chloride with vinyl chloride and wherein the heat reaction product is the reaction product of a homopolymer of allyl chloride with tributyl phosphite.

9. A composition of matter comprising polyvinyl chloride having homogeneously incorporated therein a plasticizing amount of the heat reaction product of tributyl phosphite with a homopolymer of allyl chloride having an average degree of polymerization of about 5, said heat reaction product containing about 0.4 mol of phosphorous per mol of combined allyl chloride in the homopolymer.

10. A composition of matter comprising polyvinyl chloride having homogeneously incorporated therein a plasticizing amount of the heat reaction product of triethyl phosphite with a homopolymer of allyl chloride having an average degree of polymerization of about 10, said heat reaction product containing about 0.8 mol of combined phosphorous per mol of combined allyl chloride in the homopolymer.

11. A composition of matter comprising polyvinyl chloride having homogeneously incorporated therein a plasticizing amount of the heat reaction product of tributyl phosphite with a copolymer of about 65 percent of allyl chloride with about 35 percent of vinyl acetate, said copolymer having an average degree of polymerization of about 10 and said heat reaction product containing about 0.8 mol of combined phosphorous per mol of combined allyl chloride in the copolymer.

No references cited.